Dec. 2, 1969 I. N. HOOTON ET AL 3,482,036
DIGITAL SIGNAL REPRESENTATION OF VIDEO SIGNALS WITH RANDOM SAMPLING
Filed Feb. 28, 1966
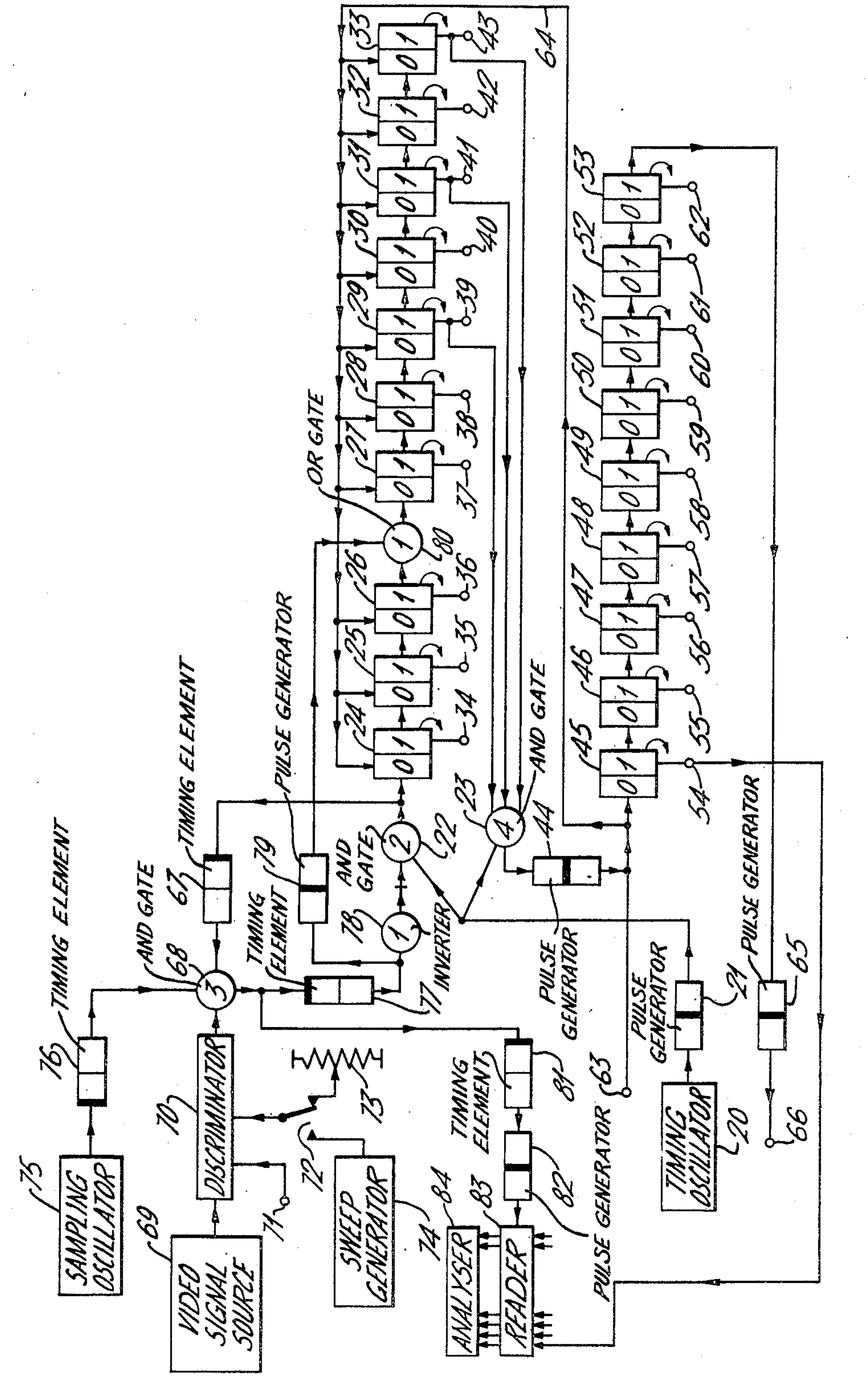

United States Patent Office 3,482,036
Patented Dec. 2, 1969

3,482,036

DIGITAL SIGNAL REPRESENTATION OF VIDEO SIGNALS WITH RANDOM SAMPLING

Ivor Noel Hooton, Cassington, Oxford, Geoffrey Cyril Best, Cowley, Oxford, and Alan Lewis, Upper Basildon, near Reading, England, assignors to United Kingdom Atomic Energy Authority, London, England Filed Feb. 28, 1966, Ser. No. 530,444
Claims priority, application Great Britain, Mar. 31, 1965, 13,758/65
Int. Cl. H03k *13/18*
U.S. Cl. 178—6 3 Claims

ABSTRACT OF THE DISCLOSURE

Binary words representing the position of successive elements in each line scan of a video signal are generated by feeding pulses into counting chains of binary stages, the pulses being appropriately synchronised with the video signal. An amplitude discriminator detects elements in the video signal having an amplitude greater than a predetermined value. The detected elements are sampled at random intervals, the instantaneous state of the counting chains being read to provide a binary word representative of the sampled element. The random sampling is at a mean frequency which is low as compared with the frequency at which the detected elements occur in the video signal.

This invention relates to video-signal digitisers.

A video-signal digitiser may be used to resolve the essentially continuous and therefore analogue information contained in a photograph or the like into digital form for an analyser or a computer. It is proposed that this should be done by producing a video signal representing the photograph or the like, and defining each element of the photograph by a binary word in which some digits represent the number of the line scan and the remainder represent the position of the element in the line.

Taking a numerical example: if a television camera is producing the video signal and has a frame repetition rate of 30 per second, scans 500 lines per frame (not interlaced), and has the usual aspect ratio of 4/3, then assuming equal resolution in each direction, $10^7$ elements are scanned per second. It is not practicable to sample the video signal at this rate, as this would generate digital data at far too high a rate for an analysing device to deal with it.

An object of the present invention is to provide a video-signal digitiser in which this difficulty is overcome.

According to the present invention, a video-signal digitiser for producing in digital form the information contained in a photograph or the like, comprises means to produce from a video signal representing the photograph or the like binary words representing those elements of the photograph or the like which have certain characteristics, said means being arranged to sample the video signal at random intervals at a frequency such that said words are produced at a low rate relative to the rate at which said elements occur in the video signal.

According to another aspect of the present invention, a method of producing in digital form the information contained in a photograph or the like comprises the steps of producing a video signal representing the photograph or the like, supplying the video signal to an amplitude discriminator, and producing in dependence upon the output signal supplied by the amplitude discriminator binary words representing those elements of the photograph or the like represented in said output signal, said words being produced by sampling said output signal at random intervals at a frequency such that said words are produced at a low rate relative to the rate at which said elements occur in the video signal.

Preferably each binary word comprises a plurality of binary digits representing the number of the line scan in which the relevant element occurs and a further plurality of binary digits representing the position of the element in that line.

A video-signal digitiser in accordance with the present invention will now be described by way of example with reference to the accompanying drawing which shows the digitiser in block schematic form.

The digitiser will be described as being used to resolve the information contained in a photograph of a nuclear event into digital form for an analyser. The photograph may comprise a number of light toned tracks on a background of comparatively dark tone. The digitiser operates by producing a video signal representing the photograph, and defining each element of the photograph by a binary word of 19 digits; 9 digits representing the number of the line and 10 digits representing the position of the element in the line. To produce these binary words the amplitude of the video signal is sampled at random intervals.

Referring now to the drawing, the digitiser comprises a 10 megacycle per second timing oscillator 20, the output of which is supplied by way of a pulse generator 21 to one input of a two input AND gate 22 and one input of a four input AND gate 23. The output of the gate 22 is connected to the first binary stage 24 of a counting chain comprising 10 binary stages 24 to 33. Outputs from the binary stages 24 to 33 are derived by way of terminals 34 to 43 respectively. The terminals 39, 41 and 43 are also connected to the other three inputs of the gate 23.

The output of the gate 23 is connected by way of a pulse generator 44 to the first binary stage 45 of a counting chain comprising 9 binary stages 45 to 53. Outputs from the binary stages 45 to 53 are derived by way of terminals 54 to 62 respectively. The output of the pulse generator 44 is also connected to a terminal 63, and by way of a connection 64 to each of the binary stages 24 to 33 for the purpose of resetting them to the "0" condition. The output of the binary stage 53 is also supplied by way of a pulse generator 65 to a terminal 66.

The output of the gate 22 is also connected by way of a timing element 67 to one input of a three input AND gate 68. A video signal source 69 is connected by way of an amplitude discriminator 70 to another input of the gate 68. The discriminator 70 can be switched on and off by the application of a signal to a terminal 71, and has two possible modes of operation controlled by the positioning of a switch 72. With the switch 72 in the position shown, the discriminator 70 passes a signal to the gate 68 when the amplitude of the video signal supplied by the source 69 exceeds some value determined by the position of the movable contact on a resistor 73. With the switch in the other position, the amplitude of the video signal necessary to cause a signal to be passed to the gate 68 is varied in dependence upon the amplitude of a signal supplied by a sweep generator 74.

The sampling of the video signal is under the control of a sampling oscillator 75 which supplies pulses, at random intervals but at a fixed mean frequency, by way of a timing element 76 to the other input of the gate 68.

The output of the gate 68 is supplied by way of a timing element 77 to an inverter 78 the negated output of which inhibits the gate 22, and also by way of a pulse generator 79 to an OR gate 80 which is interposed between the binary stages 26 and 27. The output of the gate 68 is also supplied by way of a timing element 81 and a pulse generator 82 to a reader 83, under the control of which the signals appearing at the terminals 34 to 43 and 54 to 62 are read into an analyser 84. (To avoid complication of the drawing, only the connection from the terminal 54 to the reader 83 is shown.)

The operation of the digitiser will now be described. It is assumed initially that the video signal source 69 to a television camera scanning a photograph and that the camera has a normal frame repetition rate of 30 per second, scans 500 lines per frame (the lines not being interlaced), and has the usual aspect ratio of 4/3.

So long as the discriminator 70 does not supply a signal to the gate 68 the operation is as follows. The oscillator 20 causes the pulse generator 21 to supply pulses at a repetition frequency of 10 megacycles per second to the gates 22 and 23. The pulse generator 21 is provided merely to produce pulses suitable for the operation of the subsequent circuits. So long as there is no other input to the gate 23 the pulses supplied by the pulse generator 21 have no effect. As, however, there is no signal supplied to the gate 78 the pulses supplied to the gate 22 are passed to the binary stage 24 and so to the remainder of the counting chain. After counting 672 pulses the counting chain will be supplying signals to the terminals 39, 41 and 43 and hence to the gate 23, so that the next pulse from the pulse generator 21 will also be supplied by way of the pulse generator 44 to the binary stage 45 and hence to the outer counting chain. Pulse generator 44 produces a pulse upon the termination of the pulse applied thereto which pulse will also be supplied to the terminal 63 which is connected to the line synchronising circuit of the television camera and also by way of the connection 64 to cause the binary stages 24 to 32 to be reset to their original condition.

When 512 pulses have been supplied to the binary stage 45 a signal is supplied by the binary stage 53 by way of the pulse generator 65 to the terminal 66 which is connected to the frame synchronising circuit of the television camera, pulse generator 65 producing an output upon the termination of the input thereto and thus controlling the input to terminal 66.

It will now be supposed that the video signal supplied to the discriminator 70 is such that from time to time the amplitude exceeds the amplitude determined by the position of the movable contact on the resistor 73, so that during these times a signal is supplied by the discriminator 70 to the gate 68. It is further supposed that during one of these times a signal is being supplied by the timing element 76 to the gate 68. On the occurrence of the next pulse passing the gate 22 therefore, the timing element 67 will supply a signal to the gate 68 which will thereupon supply a signal to the timing elements 77 and 81. The timing element 76 supplies pulses having durations equal to approximately 150 nanoseconds, that is rather more than one cycle at the frequency of the oscillator 20. This ensures that a pulse supplied by the timing element 76 will coincide with a pulse supplied by the timing element 67, the pulses from which are by comparison quite short.

On being supplied with a signal from the gate 68, the timing element 77 supplies a pulse to the gate 78 of a duration equal to 8 cycles at the frequency of the oscillator 20. The result of this is that a group of 8 pulses in sequence from the pulse generator 21 fail to pass the gate 22.

In addition, the output from the gate 68 is supplied to the timing element 81 which produces a pulse with a duration equal to 5 cycles at the frequency of the oscillator 20, and the pulse generator 82 produces from the trailing edge of this pulse a short pulse which is supplied to the reader 83. The timing is therefore such that the counting chain comprising the binary stages 24 to 33 has a period of 5 cycles in which to settle to rest, and the reader 83 then has a period of 3 cycles in which to read the signals from the terminals 34 to 43 and 54 to 62 into the analyser 84. These 19 signals form in effect a 19 digit binary word, the last 9 digits of which represent the number of the line scan and the first 10 digits of which indicate the position of the element in that line scan which gave rise to the signal from the discriminator 70.

The pulse generator 79 produces a short pulse from the trailing edge of the pulse supplied by the timing element 77, this short pulse passing by way of the gate 80 to the binary stage 27. This adds a count of 8 into that counting chain to compensate for the 8 pulses which did not pass the gate 22.

The purpose of the sampling oscillator 75 is to prevent binary words being produced at a higher rate than can be dealt with by the analyser.

The analyser 84 may, for example, be of the kind disclosed in U.S. Patent 3,390,380, in which casee the preferred manner of operation is for the oscillator 75 first to produce pulses at random intervals and a low mean frequency, say 1 kilocycle per second, and then for the frequency to be increased to say 150 kilocycles per second, the intervals remaining random. In this way the elements or groups of elements giving rise to binary words are located and set in the analyser 84 whilst operating at the low frequency, and counts in respect of these elements or groups of elements are then accumulated at the higher frequency.

This manner of operation can be used if it is known in advance at which amplitude the discriminator 70 should be set. Where this is not so, the switch 72 is reversed and the amplitude at which discrimination takes place is varied, at a very low rate relative to the frame repetition rate, under the control of the sweep generator 74. Initially therefore the discriminator supplies no signals to the gate 68, and the amplitude at which discrimination takes place is changed until a suitable number of signals are being supplied.

As a further alternative, a combination of these two manners of operation may be used, the sampling being initially at a low frequency and with a slowly varied amplitude of discrimination.

Although the video signal source 69 has been described as being a television camera it will be realised that this is not essential. It is merely necessary that a suitable video signal be supplied and this may, for example, be derived from a flying spot scanner.

We claim:

1. A video-signal digitiser for producing in digital form the information contained in a photograph or the like, comprising digital signal generator means for producing, from a video signal representing the photograph or the like, binary words representing the positions of those elements of the photograph or the like which have certain characteristics and randomly operative control means for providing sampling of the video signal by said digital signal generator means at random intervals and at an average frequency which is substantially less than the frequency at which said elements occur in the video signal.

2. A digitiser in accordance with claim 1, wherein said digital signal generator means includes an amplitude discriminator to which said video signal is supplied and the said control means comprises a gate to which the output signal supplied by the amplitude discriminator is supplied, a sampling oscillator means for producing pulses at random intervals but at a fixed mean frequency, said pulses being supplied to control said gate to sample the output signal supplied by the amplitude discriminator, a timing oscillator means for supplying pulses at a fixed repetition frequency, means for deriving pulses from timing oscillator pulses and for supplying pulses to said gate at the said fixed repetition frequency, this frequency defining the resolution of said elements, means for synchronizing said frequency to said video signal, and means for producing said words in dependence upon the signal supplied by said gate.

3. A digitiser in accordance with claim 2, wherein the said digital signal generator means further includes first and second counting chains of binary stages, said timing oscillator supplying pulses to drive the first counting chain which resets to zero and supplies a pulse to drive the second counting chain when a number of pulses equal to the number of elements in a line scan has been accumulated in the first counting chain, a reader, and means for rendering the reader operative in response to a signal supplied by said gate such that the reader reads the instantaneous count of the first and second counting chains, to thereby produce said binary word which comprises a plurality of binary digits representing the number of the line scan of the video signal in which the relevant element occurs and a further plurality of binary digits representing the position of the element in that line scan.

References Cited

UNITED STATES PATENTS

| | | | |
|---|---|---|---|
| 2,752,421 | 6/1956 | Ross | 178—6.8 |
| 2,916,553 | 12/1959 | Crowley | 179—15.6 |

ROBERT L. GRIFFIN, Primary Examiner

R. K. ECKERT, Jr., Assistant Examiner